April 17, 1962  E. HENNIGES  3,029,481

ELASTIC COMPOUND SEALING STRIP

Filed Oct. 22, 1959

INVENTOR
ERNST HENNIGES
BY Lowry + Rinehart
ATTYS.

United States Patent Office 3,029,481
Patented Apr. 17, 1962

3,029,481
ELASTIC COMPOUND SEALING STRIP
Ernst Henniges, 28 Waldheimstrasse, Hannover-Waldheim, Germany
Filed Oct. 22, 1959, Ser. No. 848,140
Claims priority, application Germany Oct. 23, 1958
7 Claims. (Cl. 20—69)

This invention relates to sealing strips, and more specifically to a dust and liquid tight elastic compound sealing strip which is intended for use on windows, doors, covers, especially in road or rail vehicles, doors of refrigerators, electrical appliances and the like for maintaining a tight joint between two edges or faces which can be parted in the plane of, or at right angles to the joint.

Elastic sealing strips have already become known which consist of, for instance, synthetic or natural rubber, inserted into rigid, generally U-sectioned rails and secured therein by means of a cement or adhesive. These known elastic sealing strips consist sometimes of several layers of like or different materials, such as soft rubber, foam rubber, fabric, and so forth, which are firmly bonded together by an adhesive or by vulcanization. The sealing strips consisting of several bonded or vulcanized layers are generally rather hard, a property which reduces their sealing effect and, in vehicles, insufficiently dampens vibrations when the vehicles are in motion, thus permitting the generation of rattle. Moreover, in weather strips which consist of several adhesively bonded layers, or which are adhesively attached to a supporting rail, there is also the risk that the cement or adhesive may be dissolved by rain and permit the layers to separate, or the bond between the strips and the supporting rail to be destroyed. The weather strips then become extremely susceptible to being damaged and usually rapidly become useless.

For yieldingly fitting glass panels into window frames, profiled elastic strips are already known in which two separate strip sections consisting of different elastic materials are detachably connected together in that a projecting ridge on one section is engaged by a corresponding groove in the other, and thereby form a compound unit. In this arrangement one of the strip sections does not fulfill a sealing function but merely serves as a means for fixing or retaining a movable flange of the other section.

An object envisaged by the present invention is to overcome the above mentioned defects and drawbacks of the hitherto known elastic sealing strips for sealing a joint between two members of which at least one can be moved out of sealing position, and to produce an elastic compound sealing strip which will provide a complete and durable air and liquid tight seal and which will at the same time absorb vibrations and thus suppress rattle.

Another object contemplated by the invention is the provision of an elastic compound sealing strip which is adapted to be fitted easily and quickly without much trouble, and which will permit one of the component sealing strips which was primarily subjected to wear, to be easily replaced without skilled assistance and without much expense.

The invention provides an elastic compound sealing strip for windows, doors, lids, covers and like elements, which comprises a first component strip of an elastic material selected from the group consisting of soft rubber and plastic; a continuous groove extending longitudinally in said first component strip; a second component strip of a compressible elastic material softer than that of said first component strip and selected from the group consisting of cellular rubber, sponge rubber and foam plastic; a moisture repellent pore-closing skin on the second component strip; said second component strip being adapted to removably engage with at least part thereof in said groove when the compound sealing strip is in operative position, in which position the first component strip engages the border zones of an element to be sealed, whereas the second component strip bears against one of the sides thereof.

The softer elastic component strip which bears against the side of a movable element when in closed position, such as the raised window pane of a motor vehicle, will make resilient yielding contact therewith and thus ensure an air- and water-tight sealing joint without requiring the sealed movable member to be pressed against said sealing strip with any particular pressure. The pore-closing skin of the softer elastic component strip prevents the cavities in this component strip from filling with liquid, from swelling, and from thus losing its sealing properties. Moreover, since the edges or border zones of the movable member when in closed sealed position at the same time bear tightly against the harder elastic component supporting strip, two sealing joints are actually formed, and the elastic compound sealing strip proposed by the invention will therefore provide a seal which is far superior to the sealing effect of the elastic sealing strips already known in the art.

The softer elastic component strip is held in a longitudinal groove formed in the harder elastic component strip which serves for affixing the compound strip to a base, no special bonding means or adhesives being required, the softer elastic component strip being merely inserted longitudinally into said groove or pressed into the groove in that the edges of the constricted opening of the groove are forced apart and the ridge of the softer component strip thrust into position. This provides a simple as well as convenient way of connecting the two component strips together. Since the elastic compound sealing strip thus consists of two easily separable component strips it affords the advantage that by combining different kinds of supporting strip with different kinds of softer elastic sealing strip a compound strip of suitable section and thickness can be assembled to meet any kind of contingency and to provide optimum effect in excluding draughts and preventing the ingress of water. The different elasticities of the two component strips are a useful feature of weather strip for sealing windows in motor vehicles because the combination of different elasticities in the compound strip may be utilized to suppress vibration within a wide range of frequencies. The installation of a divided compound sealing strip contrived according to the invention is very much simpler than the installation of any known type of elastic strip and is therefore less likely to cause damage being done to the softer elastic component strip. To prevent the softer elastic sealing component strip from swelling by absorbing water in its capillary pores, it is necessary to provide this cellular or sponge rubber, foam plastic, or like component strip with the external pore-closing skin.

In a preferred form of construction it is proposed to contrive the undercut ridge on the softer elastic component strip, which fits into the groove in the harder component strip, in such a way that the cross sectional area of the ridge, when the strip is not compressed is greater than the cross sectional area of the groove which is to contain it. The undercut ridge on the softer elastic compressible component strip will then be retained in the groove under pressure, the resultant fit being sufficiently tight to prevent the two component strips from unintentionally separating or from shifting the one in the other.

Further details of the invention and of the advantages which it affords will be hereinafter described by reference to the accompanying drawings which illustrate several preferred embodiments. In these drawings.

Figure 1:
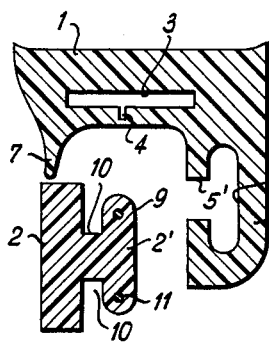
FIG. 1 is a cross section through an elastic supporting component strip affixable for instance to window frames in motor vehicles and of the cooperating softer elastic compressible component strip, the two component strips being shown when separated.
Figure 2:
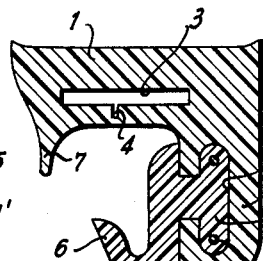
FIG. 2 is a cross section of an assembled weather strip formed by the combination of the two cooperating component strips, each formed with a sealing lip.
Figure 3:
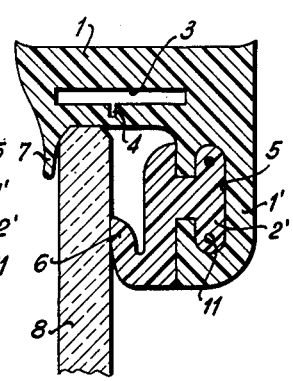
FIG. 3 is the same cross section as that shown in FIG. 2, but showing the strips in actual contact with a window pane.

With reference to FIGS. 1 to 3, the numeral 1 designates a component strip which consists of soft rubber, yielding plastic or the like material and serves as a supporting means for attachment thereto of another component strip 2 which consists of sponge or cellular rubber, foam plastic or the like material. In a manner already known in the art the strip 1 is formed with a longitudinal channel 3 of rectangular section into which it is possible to insert a metal or like rigid rail which is not specially shown. To facilitate insertion of this rigid rail into the channel 3 the latter may be formed with one or several longitudinally continuous short transverse incisions 4 which permit the channel to be more easily expanded and stretched. The supporting strip 1 is secured to its base by means of screws which are passed through appropriate holes in the rigid inserted rail and which have heads that may be countersunk in the strip 1.

In the embodiments shown in FIGS. 1 to 3 the supporting strip 1 has a flange 1' which stands upright on the base to which the strip is secured. This flange is formed with a longitudinally continuous groove 5 with a constricted opening 5'. An appropriately shaped undercut ridge 2' on the cooperating component strip 2 can be forced into this groove 5.

It will be observed by reference to FIG. 1 that the cross sectional area of the undercut ridge 2', prior to its insertion into the groove 5 and when still uncompressed, is greater than the cross sectional area of the groove. Consequently, a tight connection between the softer elastic strip 2 and the harder elastic supporting strip 1 will be established without the use of cements or other bonding means. Since the strip 2 is extremely soft and yielding, it may be inserted longitudinally into the groove 5 or simply thrust into the groove with the aid of a slightly blunted screwdriver. The latter method will as a rule be the simpler. Once properly inserted into the groove 5, the strip 2 will be reliably held, although it can be easily removed by pulling it longitudinally out of the groove 5.

In order to facilitate the sideways or direct insertion of the undercut ridge 2' of the elastic strip 2 into the groove 5 and its re-extraction when this may be desired, one or more continuous longitudinal threads, cords, or ribbons, of non-expanding or not readily stretchable material, such as cotton, plastic, or the like, may be embedded or vulcanized preferably into the undercut portion of the ridge 2' and there serve as tensile reinforcements 11. These tensile reinforcements 11 not only reduce the longitudinal elongability of the strip 2, 2' when this is drawn into or out of the groove, but they also ensure that the strip 2, once fitted into the supporting strip 1 will not lengthen in course of use.

The divided construction of the elastic compound strip permits the component strip 2 to be easily replaced if it is damaged in any way. To this end it is unnecessary first to unscrew the supporting strip from its base. Moreover, component strips 2 formed with sealing lips 6 of different shapes (see FIGS. 2 and 3) may be optionally inserted into one and the same supporting strip 1, so that one supporting strip 1 can be adapted by the insertion of the different strips 2 to various sealing purposes.

In weather strips, intended for sealing motor vehicle windows, it may be an advantage if the supporting strip 1 is likewise formed with a sealing lip 7 in a position in which, as shown in FIG. 3, this lip will embrace the outside edge or border zones of a pane 8, whereas the sealing lip 6 of the softer elastic sealing strip 2 bears against the inside face of the pane 8. This arrangement provides a completely tight joint which prevents the ingress of air and water.

Whereas known weather strips in motor car windows often permit a certain amount of rattle from the time they are freshly installed, the compound sealing strip according to the invention will not only effectively prevent rattle of windows and doors but, if in course of time rattle should be found to develop, this can at once be cured by replacing the strip 2.

The above-described divided compound strip creates a reliable water- and air-tight joint. There is a very wide choice in the selection of shapes and materials and a suitable soft material can be chosen to deal with the necessities of each individual case in such a manner that warped edges on doors, window frames, and covers will be reliably bridged by the sealing material.

In order to secure the contemplated satisfactory and lasting sealing effect it is necessary that the component strip 2, consisting of cellular or sponge rubber, plastic, and the like material, should be provided with an external skin 9 which closes the pores in such a manner as to prevent water from penetrating into said strip 2.

Figure 4:
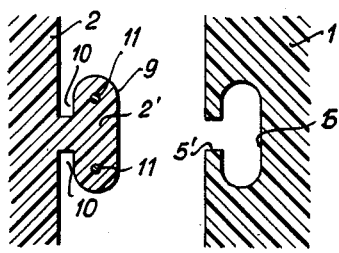
FIGS. 4 to 7 are various modifications of the engaging undercut ridge or flange of the softer compressible elastic component strip and of the cooperating groove in the supporting component strip for the reception of said ridge.
Figure 5:
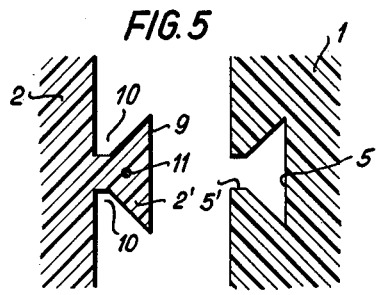
Figure 6:
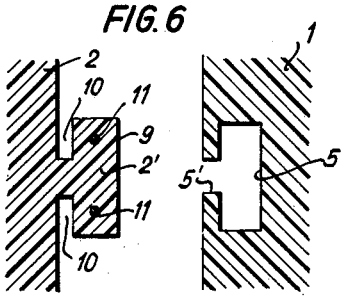
Figure 7:
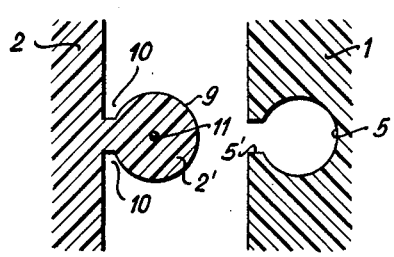

The undercut ridge 2' of the strip 2 and the groove 5 in the corresponding supporting strip 1 may have various cross sections, such as an elongated oval section with a narrow constricted stem (see FIG. 4), a dove-tail section (see FIG. 5), a T-section (see FIG. 6), or a circular section with a narrow web (see FIG. 7). A symmetrical contour with constrictions 10 on either side should be best. However, the undercut ridge 2' on the strip 2, and accordingly the groove 5 in the elastic supporting strip 1, could have an asymmetrical shape and a constricting edge 10 could be provided on one side only.

Apart from serving as a weather strip for motor car windows, the proposed compound strip can be usefully applied to all such purposes in which the creation of an air and water-tight joint is required.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. An elastic compound strip for sealing elements including windows, lids, covers and the like and being of the type in which two separate sealing strips of elastic material of different hardnesses are connected together by a ridge on one of said strips received in a like shaped groove in the other of said strips, and in which the softer of said strips is adapted to engage a face surface of the element to be sealed while the harder of said strips is adapted to engage border zones of the element; the compound strip being characterized in that said harder strip has means for mounting the same in a frame in a fixed position and includes a flange projecting beyond the sealing portion thereof, said groove being in said flange and being a longitudinally extending undercut groove, and said softer strip is of a material having great elastic compressibility such as cellular rubber, sponge rubber and foam plastic and being sealed against the entrance of foreign matter thereinto by an overall pore-closing skin, said softer strip ridge being removably seated in said groove for separation of said strips.

2. The elastic compound strip of claim 1 wherein said harder strip has a sealing lip disposed in spaced parallel relation to said flange.

3. The elastic compound strip of claim 1 wherein said harder strip has a sealing lip disposed in spaced parallel relation to said flange, and said softer strip having a sealing lip remote from said harder strip sealing lip and projecting generally towards the same.

4. An elastic compound sealing strip as claimed in claim 1, wherein a sealing lip projects from at least one of the two component strips.

5. An elastic compound sealing strip as claimed in claim 4, particularly a strip for vehicle windows vertically adjustable or longitudinally shiftable, wherein a sealing lip on the one component strip bears against the inner side and a sealing lip on the other component strip bears against the outer side of said element to be sealed.

6. An elastic compound sealing strip as claimed in claim 1, wherein at least one tensile reinforcement of a material rigid in itself and scarcely stretchable and selected from the group consisting of cotton and plastic is embedded in said undercut ridge.

7. An elastic compound sealing strip as claimed in claim 6, wherein said tensile reinforcement is vulcanized into said undercut ridge.

References Cited in the file of this patent

UNITED STATES PATENTS

| | | |
|---|---|---|
| 2,226,354 | Barr | Dec. 24, 1940 |
| 2,761,535 | Englehart | Sept. 4, 1956 |
| 2,969,252 | Gruver | Jan. 2, 1961 |

FOREIGN PATENTS

| | | |
|---|---|---|
| 639,629 | Great Britain | July 5, 1950 |
| 1,178,894 | France | Dec. 15, 1958 |